(12) United States Patent
Torii et al.

(10) Patent No.: US 7,283,631 B2
(45) Date of Patent: Oct. 16, 2007

(54) ENCRYPTION PROCESSING APPARATUS AND ENCRYPTION PROCESSING SYSTEM

(75) Inventors: Mikio Torii, Nara (JP); Yasuhiro Nakai, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 802 days.

(21) Appl. No.: 10/073,017

(22) Filed: Feb. 12, 2002

(65) Prior Publication Data

US 2002/0184495 A1 Dec. 5, 2002

(30) Foreign Application Priority Data

Jun. 5, 2001 (JP) ............................. 2001-168974

(51) Int. Cl.
*H04L 9/00* (2006.01)
(52) U.S. Cl. ................... 380/59; 380/28; 713/160; 713/165; 713/193; 713/194; 726/4
(58) Field of Classification Search ............... None
See application file for complete search history.

(56) References Cited

U.S. PATENT DOCUMENTS

| | | | | |
|---|---|---|---|---|
| 5,394,469 | A * | 2/1995 | Nagel et al. | 705/53 |
| 5,652,662 | A * | 7/1997 | Nakamura et al. | 358/405 |
| 5,680,452 | A * | 10/1997 | Shanton | 713/167 |
| 6,178,243 | B1 * | 1/2001 | Pomerantz et al. | 380/243 |
| 6,792,539 | B1 * | 9/2004 | Oishi et al. | 713/194 |
| 6,895,506 | B1 * | 5/2005 | Abu-Husein | 713/193 |

FOREIGN PATENT DOCUMENTS

| | | |
|---|---|---|
| JP | 4-3660 | 1/1992 |
| JP | 5273918 | 10/1993 |
| JP | 9101869 | 4/1997 |
| JP | 10042147 | 2/1998 |
| JP | 11227298 | 8/1999 |

OTHER PUBLICATIONS

Emosyn, 'Security Concerns for Memory Technologies in Smart Cards, Flash Versus Masked ROM', Emosyn LLC, Version:1.1 Feb. 2004, entire document, www.emosyn.atmi.com/Uploads/Flash%20Security%20White%20Paperv1.1.p.*

* cited by examiner

*Primary Examiner*—Nasser Moazzami
*Assistant Examiner*—Ronald Baum
(74) *Attorney, Agent, or Firm*—Birch, Stewart, Kolasch & Birch, LLP

(57) ABSTRACT

In the system which stores data sent out from an external equipment temporarily in a storage apparatus to output, to ensure the security of data during the storage period, there has been a conventional technique for the encryption of all received data. However, the encryption of all received data causes an increase of the load on the encryption processing and it causes such problems that much time is spent in processing of the system and efficiency is bad. In the invention, a NIC determines whether or not the data received from a host apparatus requires the encryption, and when it is determined that the data requires the encryption, the encryption processing of the data is carried out.

11 Claims, 6 Drawing Sheets

ENCRYPTION PROCESSING APPARATUS AND ENCRYPTION PROCESSING SYSTEM

BACKGROUND OF THE INVENTION

1. Field of the Invention

The invention relates to an encryption processing apparatus which performs data encryption on received data, stores the resulting encrypted data in a storage apparatus, and then outputs it from the storage apparatus, and to an encryption processing system

2. Description of the Related Art

Recently, there is known such a system that data which is sent out from a host apparatus such as a server, is temporarily stored in a storage apparatus such as a memory and hard disk drives, and thereafter the data is outputted from the storage apparatus.

One of typical examples of such systems is a printing system provided with a storage apparatus in which system, even when many users share a printer of the printing system and simultaneously send out data thereto, printing of the data is carried out in such a manner that the data is temporarily stored in the storage apparatus and is sequentially outputted from the storage apparatus to the printer.

According to the system, however, if data remains stored in the storage apparatus after being outputted from the storage apparatus, it is permitted to output the data from the storage apparatus again. It is therefore in general carried out to erase the storage data from the storage apparatus after the output of the data to the printer. This processing is very effective in cases where the data is of confidential information.

In this technique, however, at least for a certain period before the data sent out from the host apparatus is outputted to the printer after being temporarily stored in the storage apparatus, the data remains to be stored in the storage apparatus. Therefore, there is a possibility that the data is read out by a third party during the period or the storage apparatus in which the data is stored is stolen. Accordingly, it is hard to say that the security of the data is ensured.

Then, in Japanese Unexamined Patent publication JP-A 4-3660 (1992), the following technique is disclosed that received data is encrypted and stored in the storage apparatus of the facsimile, and when outputting the data, a user who is permitted to handle the stored data inserts an IC card for decrypting the data into the storage apparatus, to output decrypted data.

However, the above-mentioned technique, since all the received data is encrypted in the storage apparatus, has an inconvenience that much time is spent in the encryption processing because of burdening the storage apparatus with the processing, or data with no need for the encryption is also encrypted. Further, it has another inconvenience that the IC card should be inserted when decrypting the data.

SUMMARY OF THE INVENTION

The invention is therefore accomplished in view of the above matter, and it is an object of the invention to provide an encryption processing apparatus and system in which the efficient data storage and output is enabled by encrypting only data which is determined as having to be encrypted.

The invention provides an encryption processing apparatus comprising:

necessity determination means for determining whether or not received data needs to be encrypted; and encryption means for encrypting data which is determined as having to be encrypted, before being stored in a storage apparatus to output.

Since the invention has such a constitution, it becomes possible to encrypt only data which needs to be encrypted, of the received data, and to store the data in a storage apparatus to output with more efficiency as compared to conventional cases. In addition, since data encryption is not performed on data with no need for the encryption, the processing can be kept to be speedy.

In the invention, it is preferable that the encryption processing apparatus further comprises storage form determination means for determining a storage form of the storage apparatus and that the necessity determination means determines whether or not the data needs to be encrypted, based on a determination result of the storage form determination means.

With such a constitution of the invention, it can be judged whether the data can be read by a third party when the storage apparatus is stolen by the third party. Therefore, for example, if the data stored in the storage apparatus has low preservability, the data disappears at the time of the theft, so that the data does not need to be encrypted. Consequently, it is possible to avoid unnecessary encryption.

Also, in the invention, it is preferable that in cases where the storage form determination means determined the received data as being to be maintained in the storage apparatus even when the storage apparatus is isolated from others, the necessity determination means determines that the data needs to be encrypted.

In this case, in the same way as mentioned above, even when the storage apparatus is separately stolen, there is no possibility that contents of the data is read by the third party. Consequently, this is extremely effective in cases where the data contains confidential information.

In the invention, it is preferable that the necessity determination means is constructed so as to determine whether or not the data needs to be encrypted based on a form or items of the data.

According to the invention, since the necessity determination means determines whether the received data should be encrypted or not, it is possible to selectively encrypt only data which needs to be encrypted. Consequently, data encryption can be performed more efficiently than conventional techniques.

Further, in the invention, it is preferable that in cases where the received data is presented in an encrypted form, the necessity determination means determines that the received data does not need to be encrypted. Furthermore, it is preferable that in cases where an item of the received data is an indicator regarding importance of data (flag, instruction for confidential), the necessity determination means determines that the received data needs to be encrypted. Furthermore, it is preferable that in cases where an item of the received data is a predetermined condition, the necessity determination means determines that the received data needs to be encrypted.

With the constitution, the same as mentioned above, it becomes possible to selectively encrypt only such data that is determined as having to be encrypted by the necessity determination means with efficiency.

In the invention, it is preferable that decryption means for decrypting the encrypted data which is stored in the storage apparatus is provided, and the data is outputted after being decrypted by the decryption means.

In this way, the invention is provided with the decryption means, which allows to automatically decrypt data which was encrypted as a result of determination by the necessity determination means.

In the invention, it is preferable that the encryption processing apparatus mentioned above is used as an apparatus at a data receiving side. For example, the encryption processing apparatus of the invention may be used for a printing system comprising a host apparatus and a printer, and thereby it is possible to efficiently carry out printing of only documents that need to be subject to encryption processing.

Furthermore the invention provides an encryption processing system comprising a host apparatus for offering services such as data creation; and an encryption processing apparatus which encrypts data received from the host apparatus, stores the encrypted data in the storage apparatus, and outputs the data from the storage apparatus, the host apparatus being provided with condition providing means for providing a condition concerning encryption to data created by the host apparatus before transmitting to the encryption processing apparatus and the encryption processing apparatus comprising necessity determination means for determining based on presence or absence of the condition, whether or not received data needs to be encrypted, and encrypting at the encryption processing apparatus side the received data when the necessity determination means determines that the received data needs to be encrypted.

According to the invention such constituted, since the necessity determination means of the encryption processing apparatus can easily determine whether or not a condition regarding the encryption is provided to received data at the host apparatus side, encryption of only such data that is determined as having to be encrypted is made possible.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
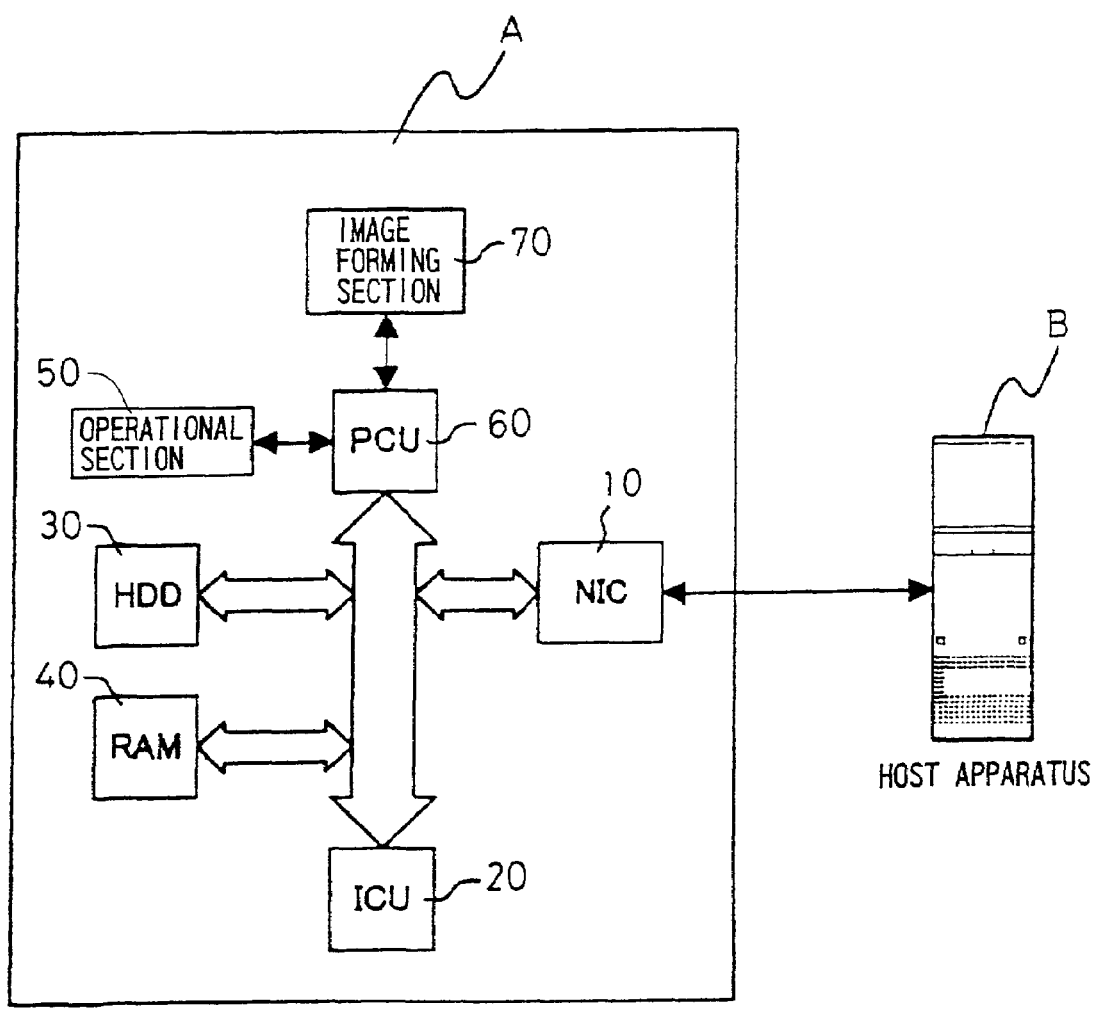
FIG. 1 is a schematic block diagram of a printer employing an encryption processing apparatus according to an embodiment of the invention.

Now referring to the drawings, preferred embodiments of the invention are described below.

Figure 2:
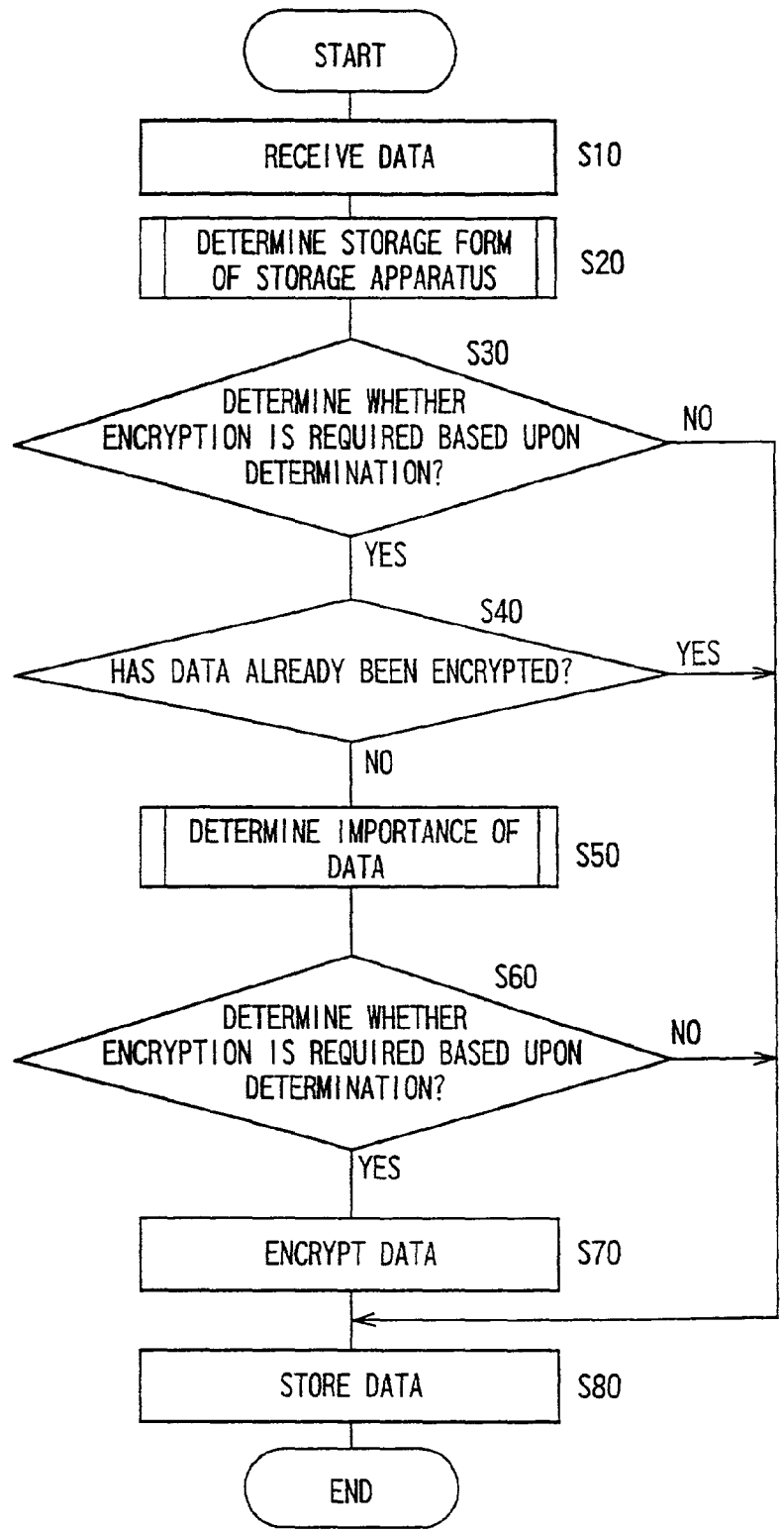
FIG. 2 is a flowchart showing a series of processing procedures by a printer employing an encryption processing apparatus according to an embodiment of the invention.
Figure 3:
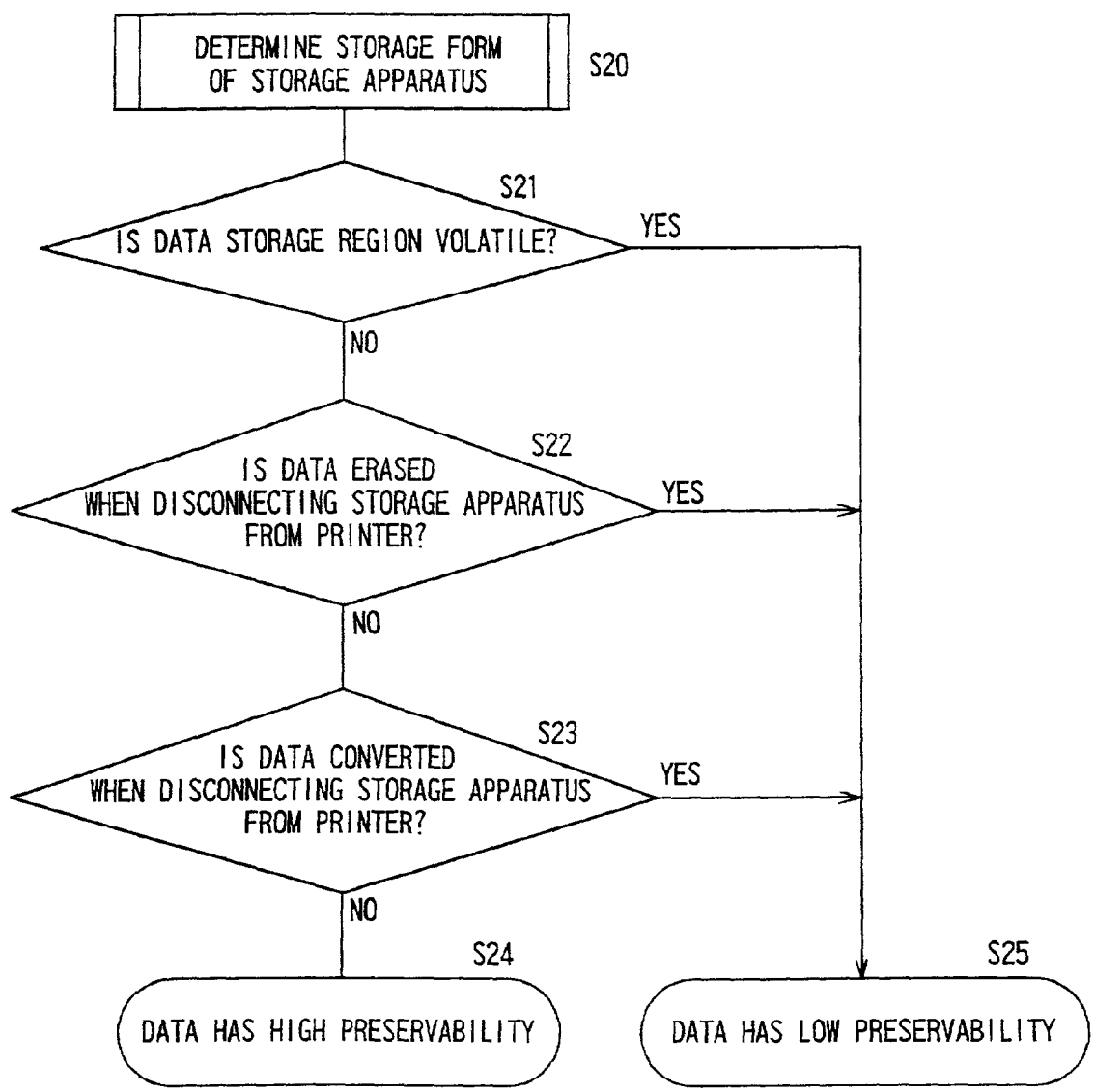
FIG. 3 is a flowchart showing a series of processes to determine a storage form of a storage apparatus.
Figure 4:
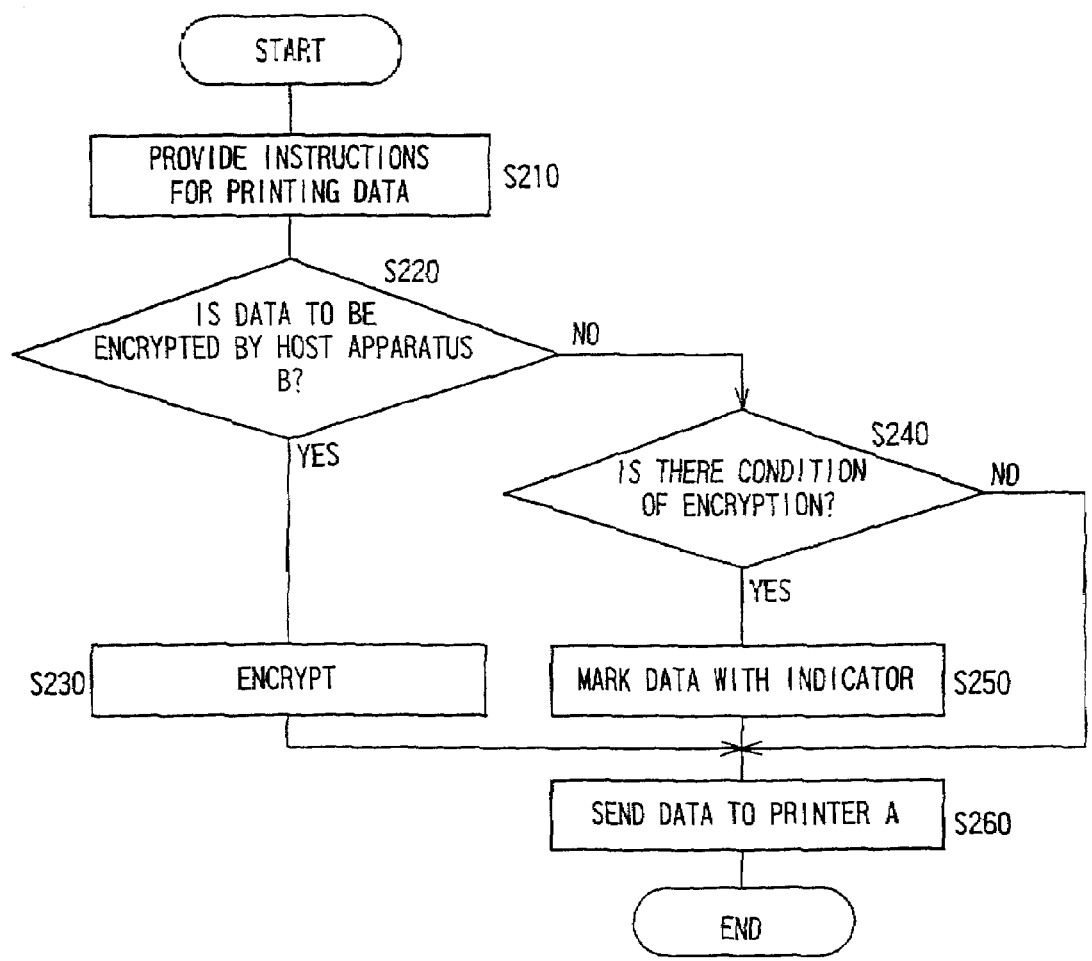
FIG. 4 is a flowchart showing a processing of providing a condition performed by a host apparatus.
Figure 5:
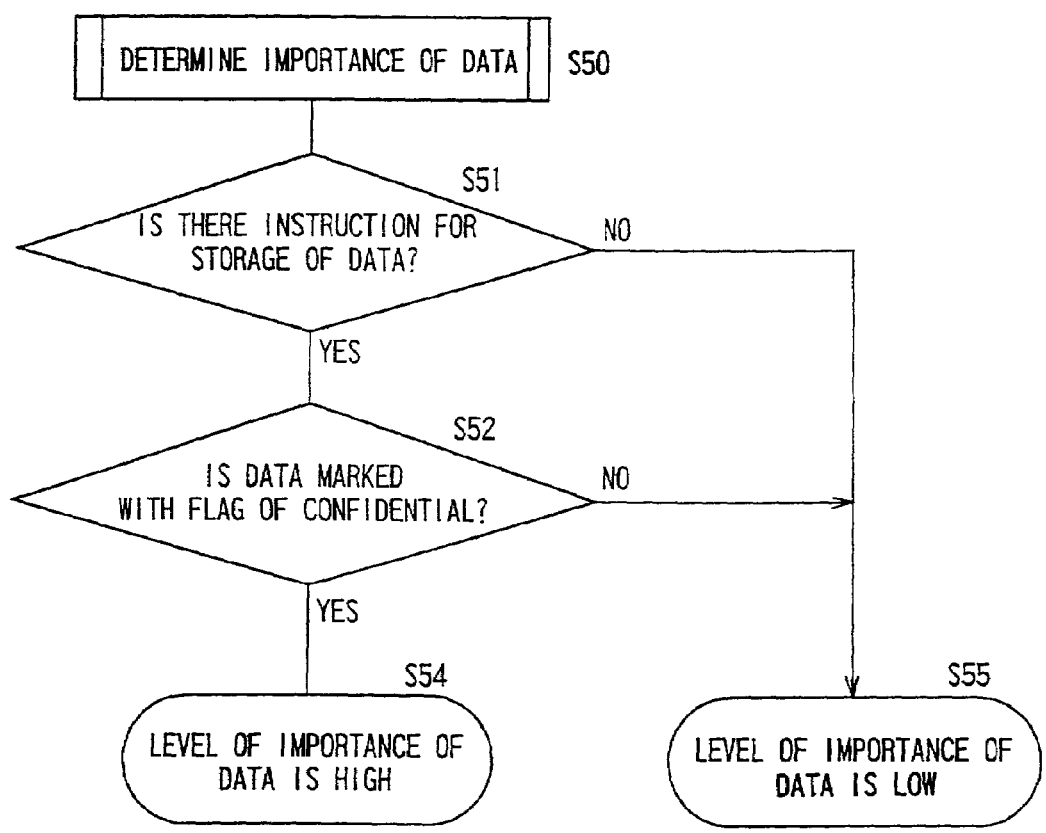
FIG. 5 is a flowchart showing a series of processes to determine importance of data.
Figure 6:
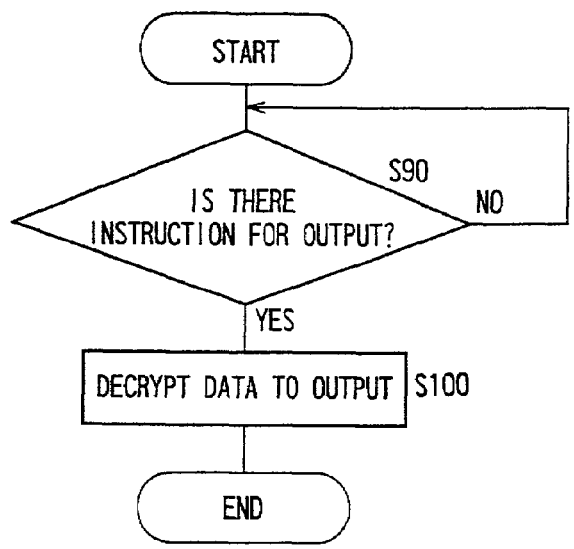
FIG. 6 is a flowchart showing a decryption processing performed by a printer.
Figure 7:
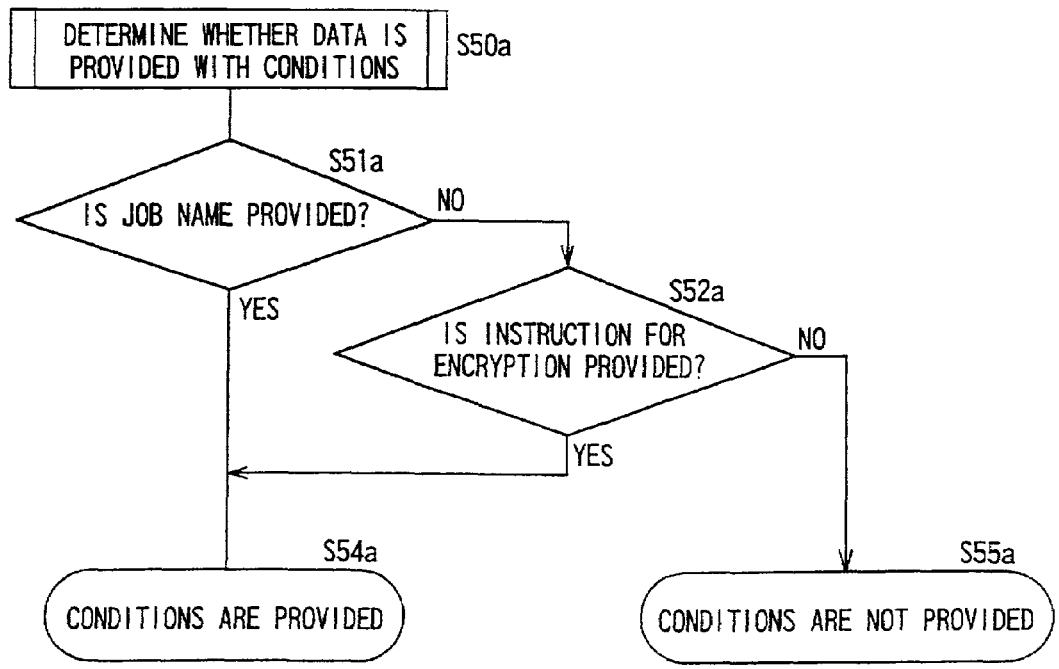
FIG. 7 is a flowchart showing a series of processes to determine whether a condition is provided to data.

FIG. 1 is a schematic block diagram of a printer employing an encryption processing apparatus according to an embodiment of the invention. FIG. 2 is a flowchart showing a series of processing procedures by a printer employing an encryption processing apparatus according to an embodiment of the invention. FIG. 3 is a flowchart showing a series of processes to determine a storage form of a storage apparatus. FIG. 4 is a flowchart showing a processing of providing a condition, which is performed by a host apparatus. FIG. 5 is a flowchart showing a series of processes to determine importance of data. FIG. 6 is a flowchart showing a decryption processing performed by a printer. FIG. 7 is a flowchart showing a series of processes to determine whether a condition is provided to data.

Firstly, referring to FIG. 1, a description will be made of a schematic configuration of a printer A as an example of apparatuses employing an encryption processing apparatus of an embodiment of the invention.

Needless to say, the encryption processing apparatus of the invention is not limited to the printer A, but it may be adopted to any kinds of apparatuses which can obtain the same effect by using the encryption processing apparatus of the invention.

The printer A has functions of determining the necessity of encryption, determining a storage form, and decrypting data, and in addition, and includes a network card 10 (hereinafter referred to as an NIC 10) in which data which is transmitted from an external apparatus (host apparatus B) and needs to be encrypted is encrypted, an image controller unit 20 (hereinafter referred to as an ICU 20) which performs various processes such as image processing on data received by the NIC 10 or the like, a hard disk drive (hereinafter referred to as an HDD) 30 (nonvolatile) and a random access memory 40 (herein after referred to as a RAM 40) (volatile) which store the data received by the NIC 10 and in which an operation program of the printer A is expanded, a printer controller unit 60 (hereinafter referred to as a PCU 60) which controls an image forming section 70 which outputs the data processed by the NIC 10 or ICU 20 by means of image formation on a sheet material, and an operational section 50 in which operation and input to the printer A is carried out by a user.

Hereinafter, the functions of determining the necessity of encryption, determining a storage form, and decrypting data will be described.

The function of determining the necessity of encryption indicates a function of determining whether or not the data received from the host apparatus B needs to be encrypted, and is implemented as a program or circuit, which is an example of encryption necessity determining means.

The function of determining a storage form indicates a function of determining the storage form such as how the storage apparatus such as the HDD 30 or RAM 40 stores data, or whether the storage apparatus is volatile or nonvolatile with respect to the stored data, and is implemented as a program or circuit, which is an example of storage form determining means.

The function of decrypting data indicates a function of decrypting the encrypted data via the PCU 60 so as to output to print in the image forming section 70, and is implemented as a program or circuit, which is an example of decrypting means.

Moreover, in the above description, the three means are provided in the NIC 10, however, it is not limited to the NIC 10. The three means may be provided inside the printer A independently thereof.

Then, referring to FIG. 2, a description will be made of a series of processes carried out by the printer A which adopts the encryption processing apparatus. The following description is made on the assumption that the above-mentioned processing such as determination processing is carried out mainly by the NIC 10. Also, the same processing may be carried out by the ICU 20, for example.

The processing starts from step S10.

The NIC 10 receives data which is sent from the host apparatus B and outputted to the printer A (S10).

Subsequent to the processing at step S10, the NIC10 determines the storage form of the storage apparatus (HDD30, RAM40) of the printer A (S20).

Referring to FIG. 3, a detailed description will be given of the processing carried out at step S20.

First, a description will be made of an assumption about the processing carried out at step S20.

At step S20 the storage form of the storage apparatus is determined. Product data (volatile storage apparatuses, nonvolatile storage apparatuses, model types and storage forms thereof), as criteria for the determination, is previously stored in the NIC 10 or ICU 20 as criteria for the determination. Based upon the product data and the information of the device driver of the storage apparatus, the determination is carried out by the NIC 10 or ICU 20 (hereinafter by the NIC 10 as mentioned above).

First, based upon the product data and information of the device driver, the determination will be made in regard to the volatility in the data storage region of the storage apparatus (HDD30, RAM40) provided with the printer A (S21). Namely, when the power of the printer A is turned off, it is determined whether or not the data stored in the data storage region of the storage apparatus is volatile. According to the determination, in the case the data is volatile, it is determined that the data which is stored in the storage apparatus possessed by the printer A is less preservable (S25). On the other hand, in the case where the data is nonvolatile, the process advances to step S22.

Next, the same as at step S21, based upon the product data and the device driver, it is determined whether or not the data stored in a data storage region volatilizes when the storage apparatus provided to the printer A is disconnected from the printer (S22). When the data is determined as being volatile, it is judged that the data which is stored in the storage apparatus possessed by the printer A is of low preservability (S25). On the other hand, when the data is nonvolatile, the process advances to step S23.

Further, the same as at steps S21 and S22, based upon the product data and the device driver, it is determined whether or not the data stored in a data storage region needs to be converted into a not-readable form by the third party when the storage apparatus possessed by the printer A is disconnected from the printer (S23). When it is determined at the determination that the data needs to be converted, the data which is stored in the storage apparatus possessed by the printer A is of low preservability (S25). On the other hand, when it is determined that the data does not need to be converted, it is judged that the data is of high preserbability (S24).

In this way, it is determined whether or not the storage form of the storage apparatus is of high preservability.

Based upon the determination result obtained at step S20, the NIC10 determines whether or not the data needs to been crypted.

Namely, at step S30, it is determined that the data does not need to be encrypted when it is judged at step 20 that the storage form of the storage apparatus is of low preservability, while being determined that the data needs to be encrypted when it is judged at step 20 that the storage form of the storage apparatus is of high preservability.

When it is determined that the data does not need to be encrypted, the process advances to step S80 to store the data in the HDD 30 or RAM 40 (S80). On the other hand, when it is determined that the data needs to be encrypted, the process advances to step S40.

Herein, referring to FIG. 4, a description will be made of the processing carried out by the host apparatus B as a presumption of steps S40 and later as illustrated in the flowchart of FIG. 2 prior to description of the steps.

A user inputs his/her instruction to the host apparatus B to print data produced at the host apparatus B side (S210).

In other words, in inputting a printing instruction at step S210, a user inputs a condition regarding encryption such as encrypting data by the host apparatus B, encrypting data by the printer A, or setting a flag of importance, confidential or the like to data. The conditions are inputted by means of condition providing means which is provided with the host apparatus B. Concretely, on the screen of a terminal equipment (not shown in the figure) provided with the host apparatus B in which data is inputted by a user, the display to select or designate the conditions is displayed in order that users can easily input the conditions by using an icon or windows format by employing GUI (Graphical User Interface). In this way, input of the conditions is carried out.

Then, the host apparatus B determines whether or not data is to be encrypted by the host apparatus B depending on the input by the user at step S210 (S220).

When it is determined at step S220 that the data is to be encrypted, encryption of the data is carried out at the host apparatus B side and then an encryption flag which indicates that the data was subjected to the encryption processing is provided to the encrypted data (S230). Then, the host apparatus B sends the encrypted data to the printer A (S260).

On the other hand, when it is determined at step S220 that the data is not to be encrypted by the host apparatus B, the process advances to step S240.

The host apparatus B determines whether or not instructions regarding printing which are inputted by the user at step S210 include any condition regarding printing (S240). When at step S240, it is determined that a condition regarding printing is inputted, an indicator which indicates that a condition regarding printing is inputted is provided to the data by the host apparatus B (S250). Then, the host apparatus B sends the flagged data to the printer A (S260).

On the other hand, when at step S240 it is determined that no condition regarding printing is inputted, the data is sent to the printer A without being processed by the host apparatus B (S260).

As mentioned above, the data sent from the host apparatus B to the printer A is marked with an indicator as a criterion in determination of whether or not the data is to be encrypted at the printer A. That is to say, based upon the indicator or the like, the printer A determines later whether or not the data should be encrypted.

At step S40 as shown in FIG. 2, the NIC 10 determines whether the received data already is in an encrypted form (S40), and when it is determined that the data is in an encrypted form, the data is stored in the HDD 30 or the RAM 40 (S80).

On the other hand, when at step S40 it is determined that the data is unencrypted, the process advances to step S50.

Further, the determination at step S40 of whether or not the data is encrypted is made possible by determining whether or not the data is marked with an encryption flag.

At step S50, importance of the data is determined by the NIC 10 based on an item provided to the data, namely an indicator regarding importance (S50).

The processing carried out at step S50 is shown in FIG. 5 in detail.

First, it is determined whether or not data is marked with a flag as one example of an indicator which instructs to save the data (S51).

When at step S51 it is determined that the flag is not set to the data, it is not necessary to save the data, namely, it is determined that the data is of little importance (low importance level) which allows the data to volatilize.

On the other hand, when at step S51 it is determined that a flag is set to the data, the process advances to step S52 to determine whether or not a flag of confidential is set to the data.

When at step S52 it is determined that a flag of confidential is not set to the data, it is determined that the data is of little importance (S55), and when at step S52 it is determined that a flag of confidential is set to the data, it is determined that the data is of high importance (S54).

Thus, when both an instruction of saving data and a flag of confidential are set to the data, the data is determined as being of high importance.

Referring now to FIG. 2, description will be made hereinafter.

Based upon the determination result regarding importance of data (importance is high (S54), importance is low (S55)) at step S50, the NIC 10 determines whether or not it is necessary to encrypt the data (S60).

Namely, in the processing carried out at step S60, it is determined that encryption is unnecessary for data which is determined as being low importance at step S50, while it is determined that encryption is necessary for data which is determined as being high importance at step S50.

Then, when it is determined that the data is not to be encrypted, the process advances to step S80 to store the data in the HDD 30 or RAN 40 (S80), and when it is determined that the data is to be encrypted, the process advances to step S70 to perform encryption (S70).

Then, the encrypted data performed at step S70 is stored in the HDD 30 or RAM 40 (S80).

As mentioned above, the processing of determination whether or not the received data is encrypted is carried out by the printer A, and thereby it becomes possible to encrypt only the data which needs to be encrypted. Also, it becomes possible to store the data temporarily in a storage apparatus with efficiency to output the data.

Furthermore, referring to FIG. 6, description will be made of the processing in which data which is stored in storage apparatus (HDD 30, RAM 40) after being encrypted in the above-mentioned processing is outputted from the printer A.

The NIC 10 determines whether or not an instruction for output is inputted to an operational section 50 by the user (S90).

Then, when the input is carried out, the data encrypted at step S70 is decrypted to produce printed output (S100).

Furthermore, at step S90, by inputting a password or ID for the data in inputting the instruction for output, the data maybe printed out. By doing this, security of the data is further improved.

Instead of the processing "determination of importance of data", which is carried out at step S50 in the embodiment, another processing may be carried out in which it is determined whether or not the data is provided with a predetermined condition (S50a).

Of course, in this case, it is noted that a predetermined condition is also inputted to the host apparatus B at step S210 shown in FIG. 4 by the user.

A series of processes for the determination will be described referring to FIG. 7.

The NIC 10 determines whether or not data is provided with a "job name" which is one of predetermined conditions (S51a).

When at step S51a it is determined that data is provided with the "job name", the data is provided with a predetermined condition.

On the other hand, when at step S51a it is determined that data is not provided with the "job name", the process advances to step S52a.

Herein, the "job name" represents, for example, the executive name in a company organization. Namely, in general, for the person having the executive name, the responsibility on works increases and the confidentiality of documents or data handled by the person also increases. Therefore, the result determining whether or not the data has the "job name" becomes criteria for evaluation when determining whether or not the encryption is necessary for data at step S60 shown in FIG. 2.

Subsequently, at step S52a, it is determined whether or not data has "instruction for encryption" which is one of predetermined conditions (S52a).

The "instruction of encryption" is implemented by a flag or the like showing that contents of the data include confidential matters and a result of determination of whether or not the flag is set to the data, which is performed at step S52a, becomes a criterion for evaluation in determining at step S60 in FIG. 2 whether or not encryption is necessary for the data.

When at step S52a it is determined that the "instruction of encryption" mentioned above is not provided to the data, it is determined that the data has no condition mentioned above (S55a). On the other hand, when it is determined that the "instruction of encryption" is provided to the data, it is determined that the data has a condition (S54a).

Subsequently, the processing at step S60 shown in FIG. 2 is carried out. When the data does not have any predetermined conditions mentioned above, it is determined that the encryption is unnecessary for the data, and when the data has any predetermined condition, it is determined that the encryption is necessary for the data (S60).

The remainder of processing will be carried out in the same way as the above mentioned embodiment.

As mentioned above, instead of "determination of importance of data" at step S50, a step of carrying out the processing to determine whether or not data has a predetermined condition is provided as step S50a, and thereby it becomes possible to define a criterion for determination performed at step S60.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An encryption processing apparatus comprising:
   necessity determination means for determining whether or not received data needs to be encrypted;
   encryption means for encrypting data which is determined as having to be encrypted, before being stored in a storage apparatus to output, and
   storage form determination means for determining a storage form of the storage apparatus, wherein the necessity determination means determines whether or not the data needs to be encrypted based on a determination result of the storage form determination means, and wherein the necessity determination means determines whether or not to encrypt the received data based on whether the storage form determination means determines that the storage form is volatile or non-volatile.

2. The encryption processing apparatus of claim 1, wherein in cases where the storage form determination means determined the received data as being to be maintained in the storage apparatus even when the storage apparatus is removed, the necessity determination means determines that the data needs to be encrypted.

3. The encryption processing apparatus of claim 1, wherein the necessity determination means is constructed so as to determine whether or not the data needs to be encrypted based on a form or items of the data.

4. The encryption processing apparatus of claim 3, wherein in cases where the received data is presented in an encrypted form, the necessity determination means determines that the received data does not need to be encrypted.

5. The encryption processing apparatus of claim 3, wherein in cases where an item of the received data is an indicator regarding importance of data, the necessity determination means determines that the received data needs to be encrypted.

6. The encryption processing apparatus of claim 5, wherein the indicator is a flag or an instruction for confidential.

7. The encryption processing apparatus of claim 3, wherein in cases where an item of the received data is a predetermined condition, the necessity determination means determines that the received data needs to be encrypted.

8. The encryption processing apparatus of claim 1, further comprising:

decryption means for decrypting the encrypted data which is stored in the storage apparatus, wherein the data is outputted after being decrypted by the decryption means.

9. The encryption processing apparatus of claim 1, the encryption processing apparatus being used as an apparatus at a data receiving side.

10. An encryption processing system comprising:

a host apparatus for offering services such as data creation; and an encryption processing apparatus which encrypts data received from the host apparatus, stores the encrypted data in the storage apparatus, and outputs the data from the storage apparatus, wherein the host apparatus is provided with condition providing means for providing a condition concerning encryption to data created by the host apparatus before transmitting to the encryption processing apparatus, and wherein the encryption processing apparatus comprises:

necessity determination means for determining based on presence or absence of the condition, whether or not received data needs to be encrypted; and storage form determination means for determining a storage form of the storage apparatus, wherein the encryption processing apparatus encrypts at the encryption processing apparatus side the received data when the necessity determination means determines that the received data needs to be encrypted, and wherein the condition is whether the storage form determination means determines that the storage form is volatile or non-volatile.

11. An encryption processing apparatus comprising:

necessity determination means for determining whether or not received data needs to be encrypted; and encryption means for encrypting data which is determined as having to be encrypted, before being stored in a storage apparatus to output, wherein the encryption processing apparatus is an image forming apparatus.

* * * * *